United States Defensive Publication [19] (H) [11] T102,402

Young [43] Nov. 2, 1982

[54] METHOD OF RECOVERING A PHOTOGRAPHIC ADDENDUM FROM A DISPERSION THEREOF

[76] Inventor: David J. Young, c/o Kodak Limited, Hemel Hempstead, Hertfordshire, England, HP1 1JU

[21] Appl. No.: 373,193

[22] Filed: Apr. 29, 1982

[30] Foreign Application Priority Data

Sep. 1, 1980 [GB] United Kingdom ..... 8028150

[51] Int. Cl.[3] ..... G03C 1/40

[52] U.S. Cl. ..... 430/449; 430/377; 430/546

[57] ABSTRACT

A water-insoluble organic photographic addendum is recovered from a dispersion of a mixture thereof and an oil-former in an aqueous medium containing a hydrophilic colloid and a surface active agent by adding a selected oleophilic non-ionic surface active agent.

4 Claims, No Sheets Drawing,

13 Pages Specification

The file of this unexamined application may be inspected and copies thereof may be purchased (849 O.G. 1221, Apr. 9, 1968).